United States Patent Office 3,411,956
Patented Nov. 19, 1968

3,411,956
THERMOCOUPLE WITH NICKEL-CONTAINING ELEMENTS
Forbes S. Sibley, Birmingham, Mich., assignor to Hoskins Manufacturing Company, Detroit, Mich., a corporation of Michigan
No Drawing. Filed Oct. 15, 1963, Ser. No. 316,445
7 Claims. (Cl. 136—236)

This invention relates to a thermocouple and more particularly a thermocouple which is adapted to be used in place of a standard iron-constantan thermocouple. The thermocouple of the present invention has a positive element comprising an alloy of the 90 Ni-10 Cr type and a negative element of the 85 Ni-15 Cu type. More specifically the positive element of the thermocouple has the following nominal composition: 10.2% Cr, 1.3% Fe, 1.0% Mo, 0.1% Si, 0.05% Al, balance Ni and the negative element of the thermocouple has a nominal composition of 85.5% Ni and 14.5% Cu.

The standard iron-constantan thermocouple has a positive leg consisting of ingot iron, thermocouple grade, and a negative leg consisting of an alloy of 44% nickel, 55% copper, and 1% manganese. The iron-constantan thermocouple has proved itself useful to science and industry over a period of many years. Its high thermoelectric power and approximately linear output, coupled with easy availability and low cost, have made this thermocouple perhaps the most widely used of all thermocouples in terms of the annual tonnages consumed. A maximum service temperature of 1400° F. is the standard recommendation for heavy gauge wires in normal industrial applications of iron-constantan thermocouples. It has long been recognized that the low resistance of iron and constantan to oxidation is a controlling factor in applying the iron-constantan thermocouple to the measurement of elevated temperatures. Thus, a poor oxidation resistance with accompanying E.M.F. drift seriously limits the useful life of an iron-constantan thermocouple at elevated temperatures particularly at temperatures above 1400° F. As is the case of thermocouples in general, the higher the operating temperature, the shorter the useful life of the thermocouple, other things being equal.

It is the object of this invention to increase the utility of the enormous inventory of temperature measuring instruments calibrated for iron-constantan thermocouples by making available a thermocouple combining the calibration of iron-constantan with greatly improved performance at elevated temperatures.

More specifically, it is the object of this invention to provide a thermocouple which conforms to the E.M.F. vs. temperature curve of iron-constantan and which, at the same time, is capable of withstanding higher temperatures for prolonged periods of time.

The positive leg of the thermocouple of this invention has the following nominal composition: 10.2% Cr, 1.3% Fe, 1.0% Mo, 0.1% Si, 0.05% Al, balance Ni. The composition range of the positive leg of the thermocouple of this invention may be as follows:

|    | Percent |
|----|---------|
| Cr | 9.0–12.5 |
| Fe | 0–2.5 |
| Mo | 0–3.0 |
| Si | 0–0.4 |
| Al | 0–0.4 |
| Ni | Balance |

However, the preferred range of composition of the positive leg of the thermocouple of this invention falls within the following narrower limits:

|    | Percent |
|----|---------|
| Cr | 10.0–11.0 |
| Fe | 1.0–2.0 |
| Mo | 0.5–1.0 |
| Si | Nil |
| Al | Nil |
| Ni | Balance |

In the above compositional range, the inclusion of molybdenum is desirable because it has a disproportionately low effect on the E.M.F. at high temperatures. Thus, the molybdenum is useful because its content in the alloy may be varied in relation to the other elements in the alloy so as to enable conforming the curve of the thermocouple to the standard curve of iron-constantan. The iron in the alloy of the positive element likewise has a beneficial effect on the E.M.F. of the alloy and, in addition, tends to inhibit green rot corrosion. The remaining elements in the positive element of the alloy are residual and are usually the result of the de-oxidizer used, the melting practice employed or contamination.

The manner in which various chemical elements affect the E.M.F. of the positive element of the thermocouple at various temperatures is indicated in Table I below:

TABLE I.—EFFECT OF ELEMENTS ON E.M.F. OF AN ALLOY HAVING THE APPROXIMATE COMPOSITION: 11% Cr, 1% Fe, 0.5% Mo, BALANCE Ni

| Element Added | Change in E.M.F. (Mv.) for 0.10% Increase in Element Content of the Alloy vs. the Base Composition as a Standard. (Ref. Junction 32° F.) | | | | | |
|---|---|---|---|---|---|---|
|  | 200° F. | 300° F. | 400° F. | 500° F. | 1,000° F. | 1,600° F. |
| Aluminum | −.04 | −.06 | −.08 | −.10 | −.20 | −.32 |
| Cobalt | −.01 | −.01 | −.01 | −.01 | −.02 | −.02 |
| Chromium | −.02 | −.03 | −.04 | −.05 | −.09 | −.11 |
| Columbium | −.02 | −.03 | −.04 | −.06 | −.10 | −.11 |
| Copper | −.01 | −.01 | −.02 | −.02 | −.04 | −.05 |
| Iron | −.01 | −.01 | −.02 | −.02 | −.04 | −.04 |
| Manganese | −.02 | −.03 | −.04 | −.04 | −.07 | −.10 |
| Molybdenum | −.01 | −.01 | −.01 | −.02 | −.02 | .00 |
| Silicon | −.05 | −.07 | −.10 | −.12 | −.26 | −.40 |
| Titanium | −.01 | −.02 | −.02 | −.03 | −.05 | −.02 |
| Tungsten | 0 | −.01 | −.01 | −.01 | −.01 | −.01 |

The nominal analysis of the negative leg of the thermocouple of this invention has a nickel content of 85.5% and a copper content of 14.5%. The maximum permissible range in the composition is copper 13.5 to 15.5% and the balance nickel. However, the preferred range of composition for the negative leg of the thermocouple comprises 14.0 to 15.0% copper and the balance nickel. With respect to the composition of the negative element of the alloy, the addition of elements other than copper and nickel is normally undesirable because the E.M.F. of the copper-nickel alloy is very sensitive to the addition of other elements. Small amounts of other elements such as iron and manganese, up to a total of about 0.3%, may be used to counteract the effect on the E.M.F. produced by deoxidants employed, such as aluminum and magnesium.

The manner in which various chemical elements affect the E.M.F. of the positive element of the thermocouple at various temperatures is indicated in Table II below:

TABLE II.—EFFECT OF E.M.F. OF AN ALLOY HAVING THE APPROXIMATE COMPOSITION: 14% Cu, BALANCE Ni

| Element Added | Change in E.M.F. (Mv.) for 0.10% Increase in Element Content of the Alloy vs. the Base Composition as a Standard. (Ref. Junction 32° F.) | | | | | |
|---|---|---|---|---|---|---|
| | 200° F. | 300° F. | 400° F. | 500° F. | 1,000° F. | 1,600° F. |
| Aluminum | +.04 | +.08 | +.14 | +.13 | +.08 | +.07 |
| Cobalt | +.01 | +.02 | +.03 | +.05 | +.16 | +.28 |
| Columbium | +.06 | +.09 | +.12 | +.15 | +.18 | +.32 |
| Copper | 0 | 0 | 0 | 0 | −.03 | −.06 |
| Iron | 0 | 0 | 0 | +.01 | +.12 | +.36 |
| Magnesium | −.06 | −.08 | −.08 | −.02 | −.02 | −.02 |
| Maganese | 0 | 0 | +.01 | +.01 | +.03 | +.07 |
| Silicon | +.07 | +.10 | +.18 | +.20 | +.29 | +.48 |
| Titanium | +.07 | +.11 | +.16 | +.18 | +.32 | +.57 |
| Zirconium | −.01 | −.01 | −.02 | 0 | +.05 | +.12 |

The preferred method of preparing the chromium-nickel alloy of the positive element consists in first melting electrolytic nickel and chromium and small percentages of the alloying additions such as the iron and molybdenum under a suitable slag in a crucible of a suitable material such as zirconium silicate. After the oxygen content of the melt has been reduced by the addition of a small percentage of one or more suitable deoxidizing agents such as alkaline earth metals, the temperature of the molten alloy is adjusted for satisfactory pouring and the metal is cast into suitable molds. After the ingots are subjected to the proper surface conditioning treatment, they are worked to a final form such as wire by well-known processes such as hot rolling and cold drawing with the usual intermediate annealing steps. Normally, the final step in the production of the wire is annealing, although subsequent heating treatments may be given the wire to prepare it for service in particular applications.

The preferred method for melting the copper-nickel alloy comprises first melting electrolytic nickel and copper under a suitable slag and after de-oxidizing the melt proceeding essentially as described above with respect to the alloy of the positive element of the thermocouple.

Improved performance of the thermocouple of this invention can be clearly shown in several ways by comparing it with iron-constantan. For example, improved performance of the thermocouple of this invention can be shown by (A) A decrease in E.M.F. drift during a specified time at an elevated temperature within the range recommended for iron-constantan, wire size and other factors being equal.

(B) An increase in time required to reach a specified E.M.F. drift, at an elevated temperature within the iron-constantan range, wire size and other factors being equal.

(C) A decrease in E.M.F. drift in a specified time, or an increase in time for a specified E.M.F. drift, at temperatures above the normal range for iron-constantan, other factors being equal.

(D) Equal E.M.F. drift in a specified time at temperature or equal time at temperature for a specified E.M.F. drift, at a wire size substantially smaller than iron-constantan, testing temperature and other factors being equal.

A comparison in the E.M.F. drift between the improved thermocouple and iron-constantan at 1400° F. is illustrated in the following table:

TABLE III

| Thermocouple | Wire Size (B and S Gage) | Change in E.M.F. (Mv.) After Indicated Hours in Air at 1400° F. | | | |
|---|---|---|---|---|---|
| | | 48 Hrs. | 96 Hrs. | 170 Hrs. | 387 Hrs. |
| Iron vs. Platinum | 14 | 0.00 | −0.02 | −0.06 | −0.18 |
| Constantan vs. Platinum | 14 | +0.05 | +0.07 | +0.10 | 0.20 |
| Iron vs. Constantan | 14 | −0.05 | −0.09 | −0.16 | −0.38 |
| Iron vs. Platinum | 20 | −0.05 | −0.08 | −0.93 | −3.38 |
| Constantan vs. Platinum | 20 | +0.07 | +0.12 | +0.14 | +0.34 |
| Iron vs. Constantan | 20 | −0.12 | −0.20 | −1.07 | −3.72 |
| 12% Cr-Ni vs. Platinum | 14 | −0.02 | −0.01 | −0.01 | +0.01 |
| 15% Cu-Ni vs. Platinum | 14 | 0.00 | +0.01 | 0.00 | 0.00 |
| 12% Cr-Ni vs. 15% Cu-Ni | 14 | −0.02 | −0.02 | −0.01 | +0.01 |
| 12% Cr-Ni vs. Platinum | 20 | −0.02 | −0.01 | −0.01 | +0.01 |
| 15% Cu-Ni vs. Platinum | 20 | −0.02 | 0.00 | −0.01 | −0.01 |
| 12% Cr-Ni vs. 15% Cu-Ni | 20 | 0.00 | −0.01 | 0.00 | +0.02 |

In the above table, as well as the tables below, the alloy designated 12% Cr-Ni is the positive leg and the alloy designated 15% Cu-Ni is the negative leg of the thermocouple of this invention. Table III illustrates the superior E.M.F. stability of the novel thermocouple compared to the iron-constantan thermocouple.

Table IV illustrates the E.M.F. values produced by the standard iron-constantan thermocouple at various temperatures:

TABLE IV.—E.M.F. vs. TEMPERATURE FOR IRON-CONSTANTAN

| | E.M.F. (Mv.) at Indicated Temperature (° F.), Ref. Junction 32° F. | | | | |
|---|---|---|---|---|---|
| | 200 | 500 | 1,000 | 1,400 | 1,600 |
| Iron-Constantan, Std. Curve | 4.91 | 14.12 | 29.52 | 42.96 | 50.05 |

The above values are specified by the National Bureau of Standards, Circular 561 and N.B.S.–R.P. 2415. The thermocouple of this invention conforms to the standard curve of iron-constantan within ±8° F. to 800° F. and ±1% from 800° F. to 1600° F.

Table V below illustrates the comparison between the oxidation of iron-constantan and the alloys of the positive and negative legs of the thermocouple of this invention. The values set forth in the table below were obtained after heating the various elements at 1400° F. in air for 64 hours.

TABLE V

| Material | Diameter (Inches) | | Increase In Dia., Percent | Increase In Weight, Percent |
|---|---|---|---|---|
| | Before Test | After Test | | |
| Thermocouple iron | .0633 | .0792 | 25 | 14.3 |
| Thermocouple constantan | .0645 | .0720 | 16 | 4.2 |
| 12% Cr-Ni | .0640 | .0645 | <0.8 | 0.64 |
| 15% Cu-Ni | .0638 | .0639 | <0.2 | 0.04 |

Table V shows that the new alloys of this invention are substantially more oxidation desistant than iron and constantan at elevated temperatures.

Table VI below compares the tensile strength of iron and constantan and the positive and negative legs of the thermocouple of this invention:

TABLE VI

| Material | Tensile Strength (p.s.i.) of 14 ga. Annealed Wires | |
|---|---|---|
| | 68° F. | 1,400° F. |
| Thermocouple iron | 53,100 | 7,500 |
| Thermocouple constantan | 64,700 | 14,900 |
| Average | 58,900 | 11,200 |
| 12% Cr-Ni | 75,800 | 43,800 |
| 15% Cu-Ni | 58,500 | 13,850 |
| Average | 67,150 | 28,825 |

Table VI shows that the average strength of the novel thermocouple is greater than the average strength of iron-constantan and also shows that the weakest leg of the novel thermocouple is stronger than the weakest leg of the iron-constantan thermocouple.

Table VII compares the melting points of the thermocouple elements of iron-constantan and the thermocouple of the present invention. From Table VII, it will be appreciated that the temperature limit for the novel thermocouple is about 300° F. higher than that of iron-constantan. This is important from the practical standpoint because in normal industrial applications, the maximum temperature at which a base metal thermocouple can operate efficiently for prolonged periods of time is directly related to the melting point of the element of lower melting point.

TABLE VII

Material:  Approximate melting point (° F.)
Iron ---------------------------------- 2795
Constantan ---------------------------- 2246
12% Cr-Ni ----------------------------- 2590
15% Cu-Ni ----------------------------- 2550

From the above tables, it is apparent that the thermocouple of the present invention is well suited as a substitute for the iron-constantan thermocouple. The new thermocouple matches the E.M.F. vs. temperature curve of iron-constantan within satisfactory commercial tolerances. The novel thermocouple is substantially more oxidation resistant than iron and constantan at elevated temperatures and exhibits superior E.M.F. stability. The chemical composition of the two alloys of the improved thermocouple accounts for the superiority of the new thermocouple. In the case of the positive leg of the element, it should be noted that alloys of nickel and chromium are inherently more oxidation resistant than the relatively pure iron used in the iron-constantan thermocouple.

With respect to the negative leg or element of the new thermocouple, it should be noted that nickel is more oxidation resistant than copper and that nickel-copper alloys rich in nickel are more oxidation resistant than those rich in copper, other things being equal. In the new thermocouple, the negative element contains nearly twice the percentage of nickel and only about ¼ of the percentage of copper found in thermocouple constantan.

In addition, as pointed out above, the molybdenum and iron beneficially affect the E.M.F. produced as well as the mechanical and/or chemical properties of the alloy of the positive leg of the thermocouple.

What is claimed is:

1. A thermocouple comprising an electropositive element composed of an alloy consisting essentially of from 9 to 12.5% chromium, up to 2.5% iron, up to 3.0% molybdenum, residual amounts of silicon and aluminum resulting from deoxidation of the melt and the balance substantially all nickel joined to an electronegative element composed of an alloy consisting essentially of 13.5 to 15.5% copper and the balance substantially all nickel, said electronegative element developing in combination with said electropositive element an electromotive force which closely conforms to the standard E.M.F. vs. temperature curve of an iron-constantan thermocouple.

2. A thermocouple comprising an electropositive element composed of an alloy consisting essentially of from 9 to 12.5% chromium, up to 2.5% iron, up to 3.0% molybdenum, residual amounts of aluminum and silicon resulting from deoxidation of the melt and the balance substantially all nickel joined to an electronegative element composed of an alloy consisting essentially of 14.0 to 15.0% copper and the balance substantially all nickel, said electronegative element developing in combination with said electropositive element an electromotive force which closely conforms to the standard E.M.F. vs. temperature curve of an iron-constantan thermocouple.

3. A thermocouple comprising an electropositive element composed of an alloy consisting essentially of from 10.0 to 11.0% chromium, 1.0 to 2.0% iron, 0.5 to 1.0% molybdenum and the balance substantially all nickel joined to an electronegative element composed of an alloy consisting essentially of 13.5 to 15.5% copper and the balance substantially all nickel, said electronegative element developing in combination with said electropositive element an electromotive force which closely conforms to the standard E.M.F. vs. temperature curve of an iron-constantan thermocouple.

4. A thermocouple comprising an electropositive element composed of an alloy consisting essentially of from 10.0 to 11.0% chromium, 1.0 to 2.0% iron, 0.5 to 1.0% molybdenum and the balance substantially all nickel joined to an electronegative element composed of an alloy consisting essentially of 14.0 to 15.0% copper and the balance substantially all nickel, said electronegative element developing in combination with said electropositive element an electromotive force which closely conforms to the standard E.M.F. vs. temperature curve of an iron-constantan thermocouple.

5. A thermocouple comprising an electropositive element composed of an alloy consisting essentially of from 10.0 to 11.0% chromium, 1.0 to 2.0% iron, 0.5 to 1.0% molybdenum and the balance substantially all nickel joined to an electronegative element composed of an alloy consisting essentially of 14.0 to 15.0% copper, a residual amount of magnesium and/or aluminum resulting from deoxidation of the melt, up to a total of 0.3% elements for counteracting the effect on the E.M.F. of the deoxidizing element and the balance substantially all nickel, said electronegative element developing in combination with said electropositive element an electromotive force which closely conforms to the standard E.M.F. vs. temperature curve of an iron-constantan thermocouple.

6. A thermocouple comprising an electropositive element composed of an alloy consisting essentially of from 10.0 to 11.0% chromium, 1.0 to 2.0% iron, 0.5 to 1.0% molybdenum and the balance substantially all nickel and an electronegative element composed of an alloy consisting essentially of 14.0 to 15.0% copper, a residual amount of magnesium and/or aluminum resulting from deoxidation of the melt, up to a total of 0.3% of iron and manganese for counteracting the effect on the E.M.F. of the deoxidizing element and the balance substantially all nickel, said electronegative element developing in combination with said electropositive element an electromotive force which closely conforms to the standard E.M.F. vs. temperature curve of an iron-constantan thermocouple.

7. A thermocouple comprising an electropositive element composed of an alloy consisting essentially of 10.2% chromium, 1.3% iron, 1.0% molybdenum, 0.1% silicon, 0.05% aluminum and the balance nickel joined to an electronegative element composed of an alloy consisting essentially of 85.5% nickel and 14.5% copper, said electronegative element developing in combination with said electropositive element an electromotive force which closely conforms to the standard E.M.F. vs. temperature curve of an iron-constantan thermocouple.

References Cited

UNITED STATES PATENTS

| | | | |
|---|---|---|---|
| 1,025,715 | 5/1912 | Peake | 136—227 |
| 2,224,573 | 12/1940 | Hunter | 136—241 X |
| 2,757,221 | 7/1956 | Guettel | 136—239 |
| 2,990,440 | 6/1961 | Obrowski et al. | 136—239 |
| 3,017,269 | 1/1962 | Finch et al. | 136—236 X |

FOREIGN PATENTS

| | | |
|---|---|---|
| 783,817 | 10/1957 | Great Britain. |
| 349,632 | 6/1905 | France. |
| 222,389 | 7/1962 | Austria. |

OTHER REFERENCES

Bureau of Standards: Technical Paper No. 170, 1921, pages 306–309.

Caswell: In, International Critical Tables, volume 6, 1929, pages 213, 214 and 219.

Hunter et al.: In, Temperature—American Institute of Physics, volume 1, 1941, pages i and 1227–1231.

ALLEN B. CURTIS, *Primary Examiner.*